United States Patent [19]
Rockenfeller

[11] Patent Number: 5,529,709
[45] Date of Patent: Jun. 25, 1996

[54] AQUEOUS ABSORPTION FLUIDS

[75] Inventor: Uwe Rockenfeller, Boulder, Nev.

[73] Assignee: Gas Research Institute, Chicago, Ill.

[21] Appl. No.: 286,698

[22] Filed: Aug. 5, 1994

Related U.S. Application Data

[60] Continuation of Ser. No. 924,859, Aug. 4, 1992, abandoned, which is a division of Ser. No. 343,026, Apr. 29, 1989, Pat. No. 5,186,009, which is a continuation-in-part of Ser. No. 215,204, Jul. 5, 1988, Pat. No. 4,823,864, which is a continuation-in-part of Ser. No. 38,323, Apr. 14, 1987, abandoned.

[51] Int. Cl.$^6$ ....................................................... C09K 5/04
[52] U.S. Cl. ........................... 212/69; 252/70; 252/71; 62/4; 62/112; 62/106; 62/480
[58] Field of Search ............................. 252/69, 70, 71; 62/4, 12, 106, 480

[56] References Cited

U.S. PATENT DOCUMENTS

| | | | |
|---|---|---|---|
| 1,734,278 | 11/1929 | Tanagerg | 252/69 |
| 4,454,724 | 6/1984 | Erickson | 252/71 |
| 4,822,391 | 4/1989 | Rockenfeller | 62/12 |
| 4,848,994 | 7/1989 | Rockenfeller | 252/71 |
| 4,875,915 | 10/1989 | Rockenfeller | 62/4 |

Primary Examiner—Douglas J. McGinty
Assistant Examiner—Necholus Ogden
Attorney, Agent, or Firm—McAndrews, Held & Malloy, Ltd.

[57] ABSTRACT

An improved absorption cycle apparatus and system using aqueous solutions of metal salts selected from the group consisting of alkali metal hydroxides, nitrites, and alkaline earth and transition metal hydroxides, halides, thiocyanates, and mixtures thereof between about 14% and about 30%, by weight, of said metal salt, of an organic compound selected from the group consisting of alcohols, glycerol, glycols, polyglycols, alkaline glycol ethers, aliphatic amines and alkanol amines.

9 Claims, 1 Drawing Sheet

AQUEOUS ABSORPTION FLUIDS

This application is a continuation of application Ser. No. 07/924,859, filed Aug. 4, 1992 abandoned which application is a division of application Ser. No. 343,026 filed Apr. 29, 1989, now U.S. Pat. No. 5,186,009 which is a continuation-in-part of application Ser. No. 215,204 filed Jul. 5, 1988 now U.S. Pat. No. 4,823,864 which is a continuation-in-part of application Ser. No. 038,323 filed Apr. 14, 1987, abandoned.

BACKGROUND OF THE INVENTION

Water vapor absorption systems have features which make them attractive candidates for use in heat pump or refrigeration systems since they eliminate the requirement for CFCs as well as the advantage of simplified and less costly equipment such as mechanical compressors and the like. Such systems are disclosed, for example, in U.S. Pat. No. 4,614,605. However, until now due to the temperature lift limitations of the working fluids, their use in heat pumps and air conditioning systems has required cooling towers or other water cooling apparatus, practical only for relatively large capacity units.

The present invention is directed to an improved aqueous absorption fluid in which the fluid composition provides for increased absorber temperatures which are sufficiently high for air-cooled absorber operation. Such an improvement makes it possible to use absorption cycle cooling systems for residential and light commercial applications.

SUMMARY OF THE INVENTION

In my aforesaid applications there are disclosed water vapor absorption compositions comprising aqueous solutions of alkali and alkaline earth metal salts containing amino and hydroxyl containing organic compounds. In the present invention aqueous compositions containing specific combinations of selected salts and organic compounds in specific concentration ranges have been found to provide improved absorption fluids having substantially extended solubility ranges and resulting increased temperature lifts. The advantages of such fluids and systems as well as the specific compositions will be disclosed in the following detailed description.

DETAILED DESCRIPTION OF THE PREFERRED EMBODIMENTS

Figure 1:
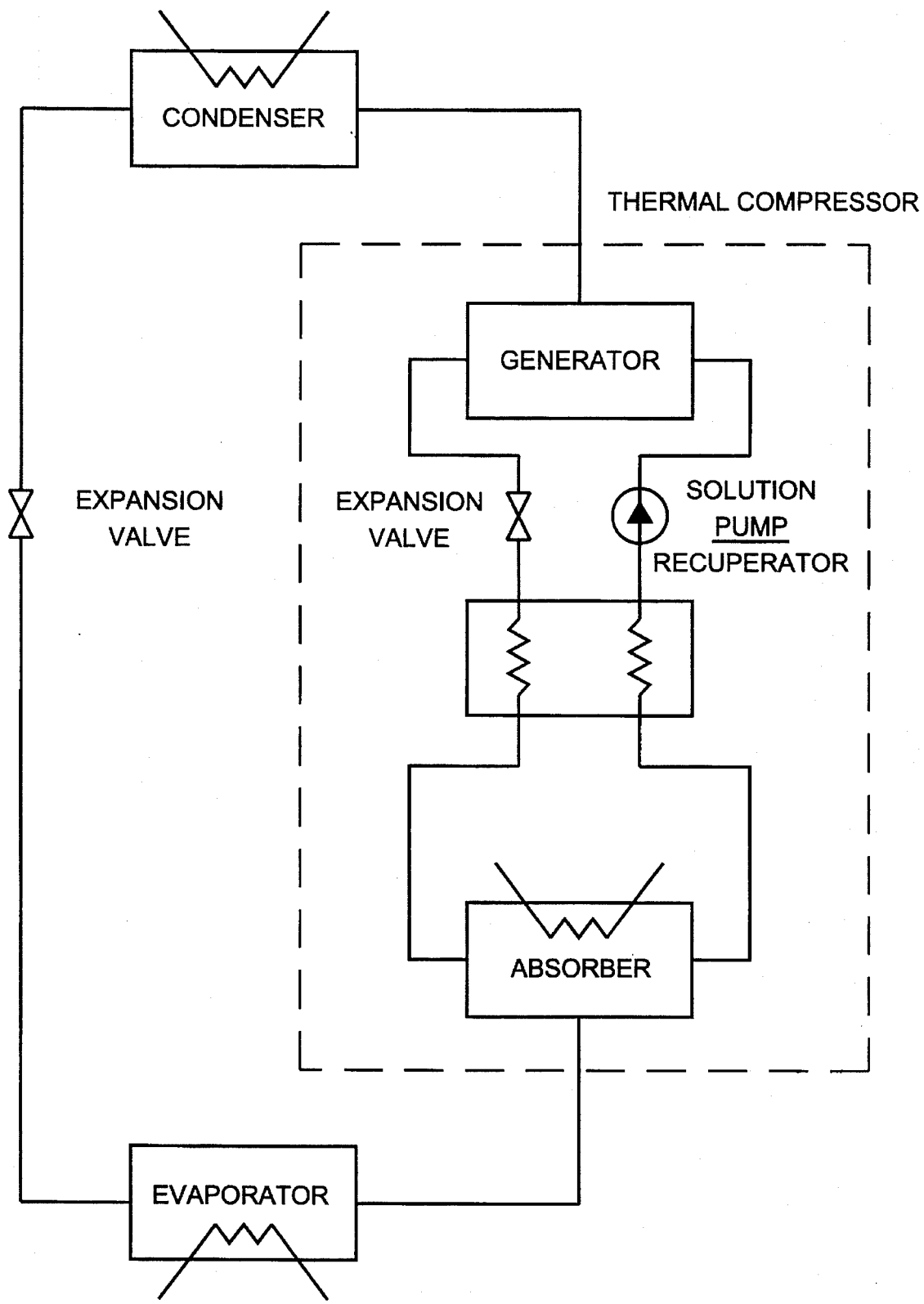
FIG. 1 is a schematic illustration of an absorption cycle apparatus or system in which the compositions of the invention are advantageously used.

The improved fluid system compositions of the present invention comprise aqueous solutions of a metal salt consisting of an alkali metal hydroxide, nitrite or mixtures thereof, and alkaline earth metal or transition metal halide, hydroxide, or thiocyanate, or mixtures thereof, or mixtures of a transition metal halide with lithium bromide, lithium chloride or mixtures thereof, having initial concentrations of between about 30 and about 80%, and preferably between about 40% and 70%, by weight. The useful transition metal salts are zinc, iron, cobalt, copper and aluminum. Most preferred salts in the aqueous systems of the invention are sodium and potassium hydroxide, and mixtures thereof, lithium nitrite, and zinc chloride, zinc bromide, and mixtures thereof. Also of special interest are combinations of the transition metal salts, particularly zinc bromide and zinc chloride, and mixtures thereof, with lithium bromide, lithium chloride and mixtures thereof. Suitable ratios of zinc:lithium salt are between about 3:1 and 1:3, by weight, respectively.

According to the invention, the absorber fluids are improved by adding to the aqueous salt solution an organic compound having an amino and/or a hydroxyl functional group. The specific organic compound meeting the requirements of the invention comprise aliphatic alcohols, glycerols, polyglycols, glycols etchers, aliphatic amines, alkanol amines, butyrolactone, and alkyl pyrrolidone. Preferred alcohols are those having between 1 and 12 carbon atoms. Lower aliphatic amines and alkanol amines are those of from 1 to about 6 carbon atoms. Examples of suitable amines are methylamine, ethylamine, etc. as well as polyamino compounds such as ethylene diamine. Preferred glycols are ethylene glycol and propylene glycol while suitable glycol ethers include ethylene glycol dimethyl ether, diethylene glycol diethyl ether, etc. Alkanol amines or other organics having both hydroxyl and an amino group such as ethanolamine and propanolamine are also preferred. Yet other useful organics include butyrolactones and n-methyl-2-pyrrolidone.

The specific amount of organic compound used in the aqueous salt solutions will depend somewhat on the specific salts used, but generally, between about 10% and about 25% based on the total weight of the aqueous fluid is required to be effective. The amount of organic compound preferably used is between about 14% and about 30% by weight, of the metal salt. Specifically, the preferred ratio of salt:organic compound is between about 2.5:1 and about 6:1 by weight, respectively. Where pyrrolidone is used with the above salts, amounts of between about 10% and about 18%, by weight of the total salt solution, are preferred. The balance of the composition is water. If desired, a corrosion inhibitor may also be used where necessary, if system components are made of materials which will be subject to deterioration due to the exposure to the aqueous salt solutions. Examples of typical corrosion inhibitors which are useful include chromates, molybdates, tungtstates and nitrates. The amount of inhibitor used is preferably between about 0.01% and about 3%, by weight, based on the total fluid.

The combination of the salt and organic absorbents yields a significant increase in absorbent solubility as well as vapor pressure reduction and consequently an increase in absorber fluid temperatures at fixed system pressure, distinctive from the use of either of the compositions, separately. For example, although the organic materials, when added to water, are known to suppress the fluid vapor pressure, the effect is quite limited, and insufficient. Similarly, the previous use of the salts alone has resulted in aqueous absorption fluid systems having the very limitations overcome by the present invention. However, with the aforesaid combination of specific salts and organics in the concentration ranges given which maximizes the total absorbent solubility and renders effective competitive absorption between the cosolvents, absorption fluid temperatures of between about 10° and about 30° F. higher than without the organic additives are achieved at the same vapor pressure conditions typically dictated by the evaporator or a desorber.

FIG. 1 illustrates schematically a typical absorption cycle heat pump or chiller apparatus in which the fluid compositions of the invention are used. In such a system water vapor is absorbed and desorbed between the absorber and generator which contain the working fluid compositions. Because practical operating evaporator temperatures are usually limited to the 42°–48° F. range, previously used working fluids have not provided sufficient temperature lifts to allow for practical use of the equipment without cooling the absorber with water. By using the fluids described above in such systems, temperature lifts above about 70° to 80° F. may be realized. Because of such high absorber fluid working temperatures, the absorber can be cooled with ambient air, thus eliminating the need for water cooling equipment or cooling towers. This advantage is especially noteworthy in residential and light commercial system markets where smaller, single stage absorption cycle units are especially useful, for example, in the 2–20 ton capacity coolers, in which the use of cooling towers is generally considered impractical. The systems of the invention may be used to create building heat from the absorber unit, which creates even a broader use of the apparatus. Temperature lifts exceeding 70°–80° F. provide useful heat transfer gradients by coupling generators with absorbers and condenser in advanced staged dual and triple effect heat pumps. The specific details of heat pump and chiller or refrigeration equipment and their operation are well known to those skilled in the art and need not be disclosed further. These as well as other modifications, variations and advantages of the systems within the purview of the invention will be evident to those skilled in the art.

I claim:

1. An aqueous composition for absorbing water vapor consisting of an aqueous solution of between about 30% and about 80%, by weight, of a metal salt selected from the group consisting of alkali metal hydroxides, nitrites, and mixtures thereof, and alkaline earth and transition metal hydroxides, halides, thiocyanates, and mixtures thereof, between 14% and about 30% of said metal salt, by weight, an organic compound selected from the group consisting of glycols, polyglycols, alkylene glycol ethers, aliphatic amines and polyamines, alkanol amines, butyrolactone and alkyl pyrrolidones, and water.

2. The composition of claim 1 wherein said organic compound is selected from the group consisting of ethanolamine, ethylene glycol and butyrolactone.

3. The composition of claim 1 and between about 0.01% and about 3% of a corrosion inhibitor.

4. The composition of claim 1 wherein said corrosion inhibitors are selected from the group consisting of chromates, molybdates, tungtstates and nitrates.

5. An aqueous composition for absorbing water vapor consisting of an aqueous solution of between about 30% and about 80%, by weight, of a zinc salt selected from the group consisting of zinc bromide, zinc chloride and mixtures thereof, between 14% and about 30% of said metal salt, by weight, an organic compound selected from the group consisting of glycols, polyglycols, alkylene glycol ethers, aliphatic amines and polyamines, alkanol amines, butyrolactone and alkyl pyrrolidones, and water.

6. The composition of claim 5 containing in addition to said zinc salts, lithium bromide, lithium chloride, or mixtures thereof, and wherein said organic compound is selected from the group consisting of alkylene glycol ethers, aliphatic amines and polyamines, alkanol amines, butyrolactone and alkyl pyrrolidones, and water.

7. An aqueous composition for absorbing water vapor consisting of an aqueous solution of between about 30% and about 80%, by weight, of a metal salt selected from the group consisting of sodium hydroxide, potassium hydroxide and mixtures thereof, between 14% and about 30% of said metal salt, by weight, an organic compound selected from the group consisting of glycols, polyglycols, alkylene glycol ethers, aliphatic amines and polyamines, alkanol amines, butyrolactone and alkyl pyrrolidones, and water.

8. An aqueous composition for absorbing water vapor consisting of an aqueous solution of between about 30% and about 80% lithium nitrite, by weight, and between 14% and about 30% of said lithium nitrite, by weight, an organic compound selected from the group consisting of glycols, polyglycols, alkylene glycol ethers, aliphatic amines and polyamines, alkanol amines, butyrolactone and alkyl pyrrolidones, and water.

9. The composition of claim 6 wherein said organic compound is selected from the group consisting of ethanolamine and butyrolactone.

\* \* \* \* \*